United States Patent [19]

Yamanaka et al.

[11] Patent Number: 4,870,046

[45] Date of Patent: Sep. 26, 1989

[54] ROLLED HIGH ALUMINUM STAINLESS STEEL FOIL FOR USE AS A SUBSTRATE FOR A CATALYST CARRIER

[75] Inventors: Mikio Yamanaka; Keiichi Ohmura, both of Sagamihara; Shinichi Matsumoto, Aichi; Shinji Shibata, Toyota; Toshiyuki Yashiro; Akihiko Kasahara, both of Itabashi, all of Japan

[73] Assignees: Nippon Steel Corporation, Tokyo; Toyota Jidosha Kabushiki Kaisha, Toyota; Nippon Kinzoku Co., Ltd., Tokyo, all of Japan

[21] Appl. No.: 184,332

[22] Filed: Apr. 21, 1988

[30] Foreign Application Priority Data

Apr. 24, 1987 [JP] Japan ................. 62-100017

[51] Int. Cl.$^4$ ............................................. B01J 32/00
[52] U.S. Cl. ..................................... 502/439; 502/527
[58] Field of Search ..................... 502/439, 527

[56] References Cited

U.S. PATENT DOCUMENTS

| | | | |
|---|---|---|---|
| 2,061,370 | 11/1936 | Rohn | 75/124 |
| 2,191,790 | 2/1940 | Franks | 75/126 |
| 3,298,826 | 1/1967 | Wukusick | 75/124 |
| 3,920,583 | 11/1975 | Pugh | 252/465 |
| 3,944,504 | 3/1976 | Ford et al. | 502/327 X |
| 3,992,161 | 11/1976 | Cairns et al. | 29/182.5 |
| 4,030,946 | 6/1977 | Muzyka et al. | 148/11.5 P |
| 4,139,376 | 2/1979 | Erickson et al. | 75/229 |
| 4,244,736 | 1/1981 | Day | 75/129 |
| 4,316,743 | 2/1982 | Kawai | 75/124 |
| 4,318,828 | 3/1982 | Chapman | 502/527 X |
| 4,376,245 | 3/1983 | Lingskog et al. | 219/552 |
| 4,414,023 | 11/1983 | Aggen et al. | 502/439 X |
| 4,602,001 | 7/1986 | Cyron | 502/439 |

FOREIGN PATENT DOCUMENTS

| | | |
|---|---|---|
| 2829373 | 4/1979 | Fed. Rep. of Germany . |
| 40-7660 | 11/1965 | Japan . |
| 48-3927 | 2/1973 | Japan . |
| 54-15035 | 6/1979 | Japan . |
| 58-23138 | 5/1983 | Japan . |
| 488426 | 11/1938 | United Kingdom . |
| 833446 | 6/1960 | United Kingdom . |
| 1492929 | 3/1977 | United Kingdom . |
| 2070642 | 7/1981 | United Kingdom . |

*Primary Examiner*—W. J. Shine
*Attorney, Agent, or Firm*—Kenyon & Kenyon

[57] ABSTRACT

A rolled high Al stainless steel foil for use as a substrate for a catalyst carrier, which comprises more than 12 wt % up to 20 wt % of Al, from 5 to 25 wt % of Cr, from 0.05 to 2 wt %, in total, of at least one element selected from the group consisting of Ti, Nb, Zr, and Hf, and the remainder substantially consisting of Fe and unavoidable elements. The stainless steel foil has an excellent resistance to oxidation in an engine exhaust gas at a temperature of 1150° C. or higher, can be obtained by foil-rolling, and enables a reduction of the exhaust back-pressure and weight of automobile catalyst converters.

2 Claims, No Drawings

ROLLED HIGH ALUMINUM STAINLESS STEEL FOIL FOR USE AS A SUBSTRATE FOR A CATALYST CARRIER

BACKGROUND OF THE INVENTION

1. Field of the Invention

The present invention relates to a stainless steel foil for use as a substrate of a catalyst carrier used in devices for purifying automobile exhaust emissions, etc.

2. Description of the Related Art

Worldwide regulations for automobile exhaust emissions have obliged manufacturers to equip all passenger automobiles with an exhaust emission control system. Several systems have been proposed, but the most widely used is a catalyst converter system whereby HC and CO are oxidized and, simultaneously, NOx is reduced. These catalyst converters have a structure such that a ceramic honeycomb mainly composed of sintered corderite is mounted in a metal cylinder to form a substrate on which $\gamma$-$Al_2O_3$ powder impregnated with a noble metal catalyst such as Pt is deposited to function as a purifying device. However, the ceramic honeycomb has drawbacks in that it has a poor resistance to mechanical impact, and in addition, shows a relatively high exhaust backpressure. In an attempt to cope with these problems, Japanese Examined Patent Publication (Kokoku) Nos. 54-15035 and 58-23138 disclose a catalyst converter in which a several tens of microns thick rolled foil of ferritic stainless steel containing up to 10 wt % of Al is laminated with another corrugated foil previously prepared, and these laminated sheets are stacked or coiled into a honeycomb followed by two stages of $Al_2O_3$ coating; the first is provided by a high temperature oxidation of the stainless steel foil and the second is a $\gamma$-$Al_2O_3$ wash coat as a catalyst carrier. Since the foil used for the metal substrate has a thickness of from 40 to 60 $\mu$m, the Al content of the foil is reduced by the growth of the aluminum oxide film when used at high temperatures. Therefore, if Al in the foil is completely consumed before an $Al_2O_3$ films grows thick enough to provide sufficient protection at service temperatures, Cr and Fe in the foil are oxidized at a higher rate, which causes a complete oxidation of the foil. To avoid this drawback, the foil used for a metal substrate should contain as high an amount as possible of Al. The above-mentioned 40 to 60 $\mu$m thick foil of ferritic stainless steel containing up to 10 wt % Al cannot withstand long term oxidation under an engine exhaust emissions environment at a temperature of 1150° C. or higher, due to the Al consumption of the foil in a relatively short time, and does not have a sufficient resistance to oxidation. The engine exhaust emissions temperature, in practice, rarely reaches a level as high as 1150° C., but a so-called "heat spot", i.e., a local high temperature region, sometimes appears due to a locally accelerated oxidation reaction on the catalyst surface, and a honeycomb failure will be initiated at this heat spot. Therefore, to ensure the reliability of the honeycomb, it must have a heat resistance of 1150° C. or higher.

Many high-Al stainless steel foils disclosed for use as a catalyst substrate contain a relatively large amount of Y. However, Y often precipitates large particles of an intermetallic compound with Fe, causing crack initiation during the cold rolling thereof to a foil, which makes foil rolling extremely difficult.

SUMMARY OF THE INVENTION

The present invention is intended to overcome the above disadvantages of the conventional foils.

Namely, the purpose of the present invention is to provide a rolled stainless steel foil for use as a substrate for a catalyst carrier, whereby the foil is resistant to long term oxidation in exhaust gas at a temperature of 1150° C. or higher, and can be rolled easily in comparison with conventional Y-containing high Al materials.

According to the present invention, there is provided a rolled high Al stainless steel foil for use as a substrate for a catalyst carrier, which comprises more than 12 wt % and up to 20 wt % of Al, from 5 to 25 wt % of Cr, from 0.05 to 2 wt %, in total, of at least one element selected from the group consisting of Ti, Nb, Zr, and Hf, and the remainder substantially consisting of Fe and unavoidable elements.

A stainless steel foil according to the present invention preferably further comprises at least one member selected from the following members (A) and (B); (A) 0.5 wt % or less REM, in total, and (B) 0.05 wt % or less of at least one element selected from the group consisting of Ca, Mg, and Ba, in total. The term REM denotes rare earth metals such as Ce, La, Nd, Pr, etc.

DESCRIPTION OF THE PREFERRED EMBODIMENTS

The present invention will be described in more detail, hereinafter.

First, the rolled stainless steel foil according to the present invention particularly features a large Al content of more than 12 wt %, to ensure a high resistance to oxidation when exposed to exhaust gas at a high temperature of 1150° C. or higher for a long period.

As mentioned above, in a several tens of microns thick stainless steel foil, the Al content in the foil is reduced by the growth of the aluminum oxide film on the surface during service at high temperatures, but the $Al_2O_3$ surface film is also highly effective in suppressing the oxidation of the underlying metal substrate. When the $Al_2O_3$ surface film grows to a certain thickness specific to the composition and temperature of the service environment, the oxidation rate of the underlying metal substrate is greatly reduced and, simultaneously, growth of the $Al_2O_3$ surface film is substantially halted. In a foil, however, the Al content of the metal substrate is reduced by the growth of the $Al_2O_3$ surface film. If the Al content is reduced to a value of less than 2 wt % before the $Al_2O_3$ surface film grows to the above mentioned thickness that will provide a sufficient protection, the surface oxide film will begin to contain the oxides of Cr and Fe, causing a higher oxidation rate, and finally, an accelerated oxidation occurs resulting in an oxidation of the whole thickness of the foil.

To maintain an oxidation resistance of a 40 to 60 $\mu$m-thick steel foil containing Al against long term exposure to engine exhaust emissions at temperatures of 1150° C. or higher, the present inventors have found that more than 12 wt % of Al must be contained in the foil. However, a large amount of Al lowers the melting point of the steel, and an Al addition of more than 20 wt % brings the steel melting point close to the service temperature, with the result that the high temperature strength of the steel is sharply decreased. To avoid this drawback, the upper limit of the Al content must be 20 wt %.

The stainless steel foil according to the present invention must contain at least 5 wt % of Cr to ensure a stable formation of the $Al_2O_3$ coating, but a Cr content of more than 25 wt % will cause the precipitation of undesirable phases under the presence of Al. Therefore, the Cr content must be in the range of from 5 to 25 wt %.

The high Al content may lead to an embrittlement of the metal matrix. To avoid this drawback, Ti, Nb, Zr, and Hf are added; since these elements fix the solute C and N in the matrix and thus effectively recover the ductility of the matrix and ensure foil-rolling, as well as stabilizing the $Al_2O_3$ surface film. This effect is significant when these elements are added in an amount of 0.05 wt % or more, in total. If the total amount of these elements exceeds 2 wt %, a precipitation of intermetallic compounds will occur which will have an adverse effect on toughness and ductility of the material. Therefore, Ti, Nb, Zr, and Hf are added in the range of from 0.05% to 2 wt %, in total.

To further improve the oxidation resistance, a stainless steel foil according to the present invention preferably further comprises at least one member selected from the following members (A) and (B); (A) 0.5 wt % or less, in total, of REM and (B) 0.05 wt % or less, in total, of at least one element selected from the group consisting of Ca, Mg, and Ba. The addition of these members in an amount exceeding the respective upper limits does not provide a further improvement of the oxidation resistance but causes the formation of harmful precipitate phases. Note, it is not necessary to specify the lower limits, since these members may be added in an amount not exceeding the upper limits, in accordance with a desired degree of improvement. The present inventors have observed the effect of these members even at an extremely small amount such as 0.01 wt % for REM and 0.0005 wt % for Ca, Mg, and Ba, in total, respectively.

The stainless steel foil according to the present invention usually contains, as elements unavoidably included during the steelmaking, 0.1 wt % or less of C, 2 wt % or less of Si, 2 wt % or less of Mn, 0.5 wt % or less of P, and 0.1 wt % or less of S.

The stainless steel foil according to the present invention may further comprise 0.5 to 5 wt % of Mo, W, and Co, respectively, to improve the high temperature strength.

The stainless steel foil according to the present invention is produced through the conventional processes of melting by an ordinary melting process followed by casting as an ingot or by continuous-casting as a slab, hot rolling, and cold rolling. In these processes, the material must be dealt with at a temperature higher than its ductile-to-brittle transition temperature until the hot rolling is completed, because an ingot or slab of a high Al material has a low toughness at room temperature. Further, if severe edge cracking occurs during hot rolling, for example, the material must be coated with another material having an excellent rollability, such as carbon steel, before the hot rolling, and the coating removed by pickling after annealing. In the cold rolling step, for example, the rolled material must be heated at a temperature above its transition temperature, measured by the Charpy test, before cold rolling.

The cold rolled stainless steel foil is then formed into a substrate structure for a catalyst carrier such as a honeycomb by a conventional process. When forming the honeycomb, the stainless steel foil is formed into a corrugated sheet, which is then laminated with another sheet of unformed flat foil. The thus laminated sheets are coiled into a roll or stacked to obtain a structure having a predetermined sectional shape, which is then mounted into an outer sleeve of heat resisting steel and partially or entirely bonded by brazing to obtain a honeycomb.

Hereinbelow, the present invention will be described in more detail by way of examples.

EXAMPLE 1

The steels having the compositions (wt %) shown in Table 1 were prepared by using a 25 kg vacuum melting furnace. For the steels D to P having an Al content of 7 wt % or more, the ingots were removed from the molds immediately after casting, surface-worked by grinding at a temperature of 300° C. or higher, and placed in boxes of SPHC (a hot rolled carbon steel sheet) having a thickness of 6 mm, which boxes had been previously made to accommodate that size of ingot. The boxes were then closed by welding a lid thereto, evacuated, and sealed. The thus boxed ingots and those of the steels A to C were heated at 1200° C. and hot rolled to form 2 mm-thick sheets. The hot rolled sheets were then annealed, at 1200° C. for the sheet C containing Ni and at 850° C. for other sheets, and then sheets of steels A, B, and C, were pickled for descaling and the carbon steel was removed from the sheet surface of steels D to P. The sheets were then surface-treated by an entire-surface-grinding process, heated to 300° C. (except for the sheets A and C), cold rolled (including the sheets A and C), annealed in vacuum at a rolled thickness of 0.3 mm, and then coil-rolled to obtain 50 mm-thick foils.

Note, with regard to the materials of B, D, and E, which contain Y, microcracking occurred probably due to the presence of intermetallic compounds of Y, and thus 50 mm-thick sheets of the steels D and E were not obtained because of the microcracking during rolling.

The thus-obtained 50 mm-thick foils were cut into 20 mm×20 mm specimens. After degreasing, the specimens were heated in an electric furnace containing the exhaust gas from a gasoline engine at 1150° C. for 6 hours, and this was repeated 50 times (300 hours in total) at most. At earlier times of heating, each sample became gray in color, which indicated the formation of an oxide film mainly composed of $Al_2O_3$. In the specimens of the comparative steels A to E, black scale was observed at 16 to 37 times of heating, which indicated an abnormal oxidation. In the foils of the present inventive steels F to P, however, no abnormal oxidation occurred even after 50 times of heating. Further, the foils K to P were additionally heated 50 times at 1200° C. in the same manner, but no abnormal oxidation appeared and merely a light brown surface was observed.

TABLE 1

|  |  | Al | Cr | Ti | Nb | Zr | Hf | Y | REM. | Ca | Mg | Ba | Others |
|---|---|---|---|---|---|---|---|---|---|---|---|---|---|
| Comparative Steel Foil | A | 3.1 | 18.2 | 0.31 | — | — | — | — | — | — | — | — | |
| | B | 4.9 | 19.7 | — | — | — | — | 0.15 | — | — | — | — | |
| | C | 5.1 | 17.2 | — | — | — | — | — | 0.03 | — | — | — | Ni 26 |

TABLE 1-continued

|  |  | Al | Cr | Ti | Nb | Zr | Hf | Y | REM. | Ca | Mg | Ba | Others |
|---|---|---|---|---|---|---|---|---|---|---|---|---|---|
|  | D | 7.2 | 12.1 | — | — | — | — | 0.20 | — | — | — | — |  |
|  | E | 9.5 | 10.3 | — | — | — | — | 0.17 | — | — | — | — |  |
| Inventive | F | 12.2 | 21.1 | 0.32 | — | — | — | — | — | — | — | — |  |
| Steel Foil | G | 14.0 | 15.3 | 0.24 | 0.12 | — | — | — | — | — | — | — |  |
|  | H | 15.4 | 12.1 | — | — | 0.31 | — | — | — | — | — | — |  |
|  | I | 17.3 | 9.2 | 0.21 | — | — | 0.13 | — | — | — | — | — |  |
|  | J | 19.2 | 6.1 | — | — | 0.23 | 0.11 | — | — | — | — | — |  |
|  | K | 13.4 | 11.0 | 0.12 | — | — | — | — | 0.03 | — | — | — |  |
|  | L | 12.4 | 12.1 | — | 0.13 | 0.21 | — | — | — | 0.002 | — | — |  |
|  | M | 14.7 | 11.8 | — | — | — | 0.22 | — | — | — | 0.002 | — |  |
|  | O | 16.2 | 7.2 | — | — | 0.32 | — | — | — | — | — | 0.001 |  |
|  | P | 17.0 | 5.5 | — | — | — | 0.10 | — | — | 0.002 | — | — |  |

EXAMPLE 2

Honeycombs 400 mesh/in, 100 mm in dia., and 100 mm long were produced by coiling into rolls the foils B, G, and L shown in Table 1. The outer sleeves were made by welding a 1.2 mm-thick sheet of 15 Cr-4 Al steel. Brazing was carried out for a distance of 10 mm at both ends of the above-obtained honeycombs and over the whole outer surface of the honeycomb in contact with the sleeve.

Without wash-coating with $\gamma$-$Al_2O_3$, the three honeycombs in the as-obtained condition were placed in a catalyst chamber immediately below the manifold of a 1800 cc-gasoline engine and bench-tested at an engine speed of 5000 rpm. The test was carried out under the condition that angle of advance of the ignition was such that the exhaust gas temperature was maintained in the range of from 1000 to 1035° C. The test was carried out for 6 hours and was repeated five times, and the honeycombs were then removed from the bench and checked for damage.

In this test, the exhaust emissions flow speed was extremely high, which provided a more severe test condition even though the testing temperature was relatively low in comparison with the test mentioned in Example 1 carried out under a condition of a substantially static atmosphere. The results showed that the honeycomb of the comparative steel B was entirely coloured black and a part thereof was lost due to complete oxidation. The honeycombs of the present inventive foils G and L, however, were coloured light brown and there was no damage such as abnormal oxidation or partial loss.

As described above, the present invention provides a high Al stainless steel foil for use as a substrate of a catalyst carrier, whereby the foil has an excellent resistance to oxidation in an engine exhaust gas at a temperature of 1150° C. or higher, can be obtained by foil-rolling, and enables a reduction of the exhaust back-pressure and weight of the automobile catalyst converters, and thus contributes to an improvement of the automobile performance and is highly advantageous to industry.

We claim:

1. A rolled high Al stainless steel foil for use as a substrate for a catalyst carrier, which comprises more than 12 wt % up to 20 wt % of Al, from 5 to 25 wt % of Cr, from 0.05 to 2 wt %, in total, of at least one element selected from the group consisting of Ti, Nb, Zr, and Hf, and the remainder substantially consisting of Fe and unavoidable elements.

2. A stainless steel foil according to claim 1, which further comprises at least one member selected from the following members (A) and (B);
   (A) 0.5 wt % or less of rare earth metal, in total, and
   (B) 0.05 wt % or less, in total, of at least one element selected from the group consisting of Ca, Mg, and Ba.

* * * * *